(12) United States Patent
Sheldon et al.

(10) Patent No.: US 7,549,129 B2
(45) Date of Patent: Jun. 16, 2009

(54) COMPUTER SYSTEM WITH ENHANCED USER INTERFACE FOR IMAGES

(75) Inventors: Michael G. Sheldon, Seattle, WA (US); Franc Camara, Redmond, WA (US); Todd Ouzts, Redmond, WA (US); Chris Guzak, Kirkland, WA (US); Rajesh Ganesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 10/185,327

(22) Filed: Jun. 28, 2002

(65) Prior Publication Data

US 2003/0081011 A1 May 1, 2003

Related U.S. Application Data

(60) Provisional application No. 60/335,737, filed on Oct. 31, 2001.

(51) Int. Cl.
*G06F 3/00* (2006.01)
(52) U.S. Cl. ........................... 715/835; 715/838
(58) Field of Classification Search ............... 715/776, 715/810, 853, 854, 804, 730, 835, 838
See application file for complete search history.

(56) References Cited

U.S. PATENT DOCUMENTS

| | | | |
|---|---|---|---|
| 6,009,442 A * | 12/1999 | Chen et al. | 715/522 |
| 6,028,603 A * | 2/2000 | Wang et al. | 715/776 |
| 6,396,941 B1 * | 5/2002 | Bacus et al. | 382/128 |
| 6,496,206 B1 * | 12/2002 | Mernyk et al. | 715/835 |
| 6,515,704 B1 * | 2/2003 | Sato | 348/333.11 |
| 6,680,749 B1 * | 1/2004 | Anderson et al. | 348/231.99 |

\* cited by examiner

*Primary Examiner*—Tadesse Hailu
*Assistant Examiner*—Michael Roswell
(74) *Attorney, Agent, or Firm*—Shook, Hardy & Bacon L.L.P.

(57) ABSTRACT

A computer system and method are presented that enhance a user experience when viewing images displayed on the computer. The system includes a user interface for the computer that displays a number of thumbnail images that are representations of image files existing on the computer. The thumbnail images are arranged in alignment with one another, such as at the bottom of a viewing window. An enlarged preview image is positioned adjacent the thumbnail image. The preview image corresponds to a selected one of the thumbnail images. A control is displayed in the window that enables the user to iterate through the thumbnail images in at least one direction. As the user iterates through the thumbnail images, the enlarged preview image changes correspondingly.

8 Claims, 14 Drawing Sheets

COMPUTER SYSTEM WITH ENHANCED USER INTERFACE FOR IMAGES

CROSS-REFERENCE TO RELATED APPLICATIONS

This application claims the benefit of U.S. Provisional Application Ser. No. 60/335,737, filed Oct. 31, 2001.

STATEMENT REGARDING FEDERALLY-SPONSORED RESEARCH OR DEVELOPMENT

None.

TECHNICAL FIELD

In general, the present invention relates to computer software, and more particularly, to features of a computer software program designed to enhance the user experience pertaining to image files and the handling thereof.

BACKGROUND OF THE INVENTION

Personal computers (PCs) typically include hardware devices such as a processor and a memory for implementing various software programs, a principal one being a central operating environment. In turn, the operating environment, or operating system, supports the variety of other software applications such as a word processing program or a spreadsheet program. As computers have evolved, the operating systems have also evolved.

Some operating systems include a graphical user interface (GUI), described generally as a graphical operating system, which displays various information to the user as a combination of pictures and text that the user can manipulate. Generally, the graphical operating systems may display on the screen a work area known as a desktop. The desktop is an on-screen work area that uses icons and menus to simulate the top of a desk. The intent of the desktop is to make a computer easier to use by enabling users to move pictures or objects and to start and stop tasks in much the same way as they would if they were working on a physical desktop. As users add application programs to the storage area of the computer, they may create what is known as a desktop shortcut. This action merely adds an icon to the desktop that may be double-clicked by the user to initiate the application, a text or data file, or a Web page. As users personalize the desktop by using it as a space for their shortcuts, the desktop can become cluttered with shortcuts that are unused for long periods of time. The goal of personalization is thus lost as the desktop becomes filled with items that are irrelevant to the user on most occasions. It would be desirable to provide a method and system that assists users in identifying and cleaning-up the irrelevant and infrequently used shortcuts existing on a desktop, thereby effectively "re-personalizing" the desktop.

As stated above, many personal computers utilize a graphical operating system. These graphical operating systems are typically easier to use for the great majority of computer users. In such a graphical operating environment, media is typically stored in a hierarchical fashion and is organized with files of information or media stored within folders. As each file or folder is selected, a number of tasks are available to operate on the file in some way. For example, when a file is selected, the file may be moved, copied or deleted. Similarly, if a folder is selected, the folder may be copied, renamed or deleted. The number of tasks and the type of tasks available depend upon whether the item is a folder or a file and upon the type of item. As another example, different tasks may be available for electronic music files than are available for electronic picture files. The tasks available are typically provided in a drop-down menu and may also be executed by a series of known key-strokes. It has been found that with existing graphical operating systems, however, many users have trouble managing files and folders on a daily basis. Some users fail to easily accomplish even the most basic of tasks, such as moving a file to a removable disk. Part of the problem is that the relevant, available tasks or commands are buried within the drop-down menu that is not intuitive to the computer user. Computer users therefore have trouble discovering the needed commands and have difficulty in understanding how these commands relate to the selection on the screen. It would therefore be desirable to provide a system and method that allows computer users to more easily identify the tasks or commands available for a given selection.

It is also the case within a graphical operating system that computer users may from time to time install new applications on the computer. For example, a computer user may install a new computer game onto the computer. The computer user may install a desktop icon as a shortcut to the newly installed application. It may also be the case, however, that the user does not create a desktop icon as a shortcut, but merely installs the application into the hierarchical system. For example, the computer game may be installed within the directory within a "games" folder, that is itself within a "programs" folder. To access the newly installed game, the user must access the file system, then the programs folder, then the games folder, which will expose the newly installed game. This process is less than intuitive and can obscure the newly installed application from the user, thereby causing frustration to the user and limiting the user's ability to properly utilize the newly installed application. It would be desirable to provide a method and system designed to remove barriers between users and their newly installed applications.

As stated above, one of the items stored on the computer may be a series of electronic pictures. It is becoming increasingly more common for users to create and store pictures on their computers. When using a prior art graphical operating system, the pictures created are stored using the file and folder system. In other words, a series of picture files appears, and the computer user may select a particular file for full viewing on the screen as well as any further processing. Moreover, the picture files may appear with an associated "thumbnail" image, which is small representation of the picture file. When only a small number of pictures is contained within a folder, it would be desirable to view a larger representation of the picture file, as compared to the thumbnail view, without having to open the picture file itself.

When a user selects a file to open, the operating system will attempt to launch the underlying software needed to open the file for processing. For example, if the user opens a text document file, the operating system will open the word processing software associated with the text document. Similarly, if the user attempts to open an email attachment, the operating system o: will look for the underlying software needed to open the document. It may be the case, however, that the software needed to open the file is not yet installed on the computer of the user. In this instance, the operating system will return a message informing the user that the attempt to open the file failed for the reason that the necessary software was missing. This problem is solved in the prior art only by a user locating, acquiring and installing the software needed on the computer. This can be a time-consuming task and can be difficult especially for novice computer users. Novice computer users are just as likely to abandon attempts to open the file. It would be desirable to have a computer system and method that automatically located the needed software for a particular file, and that gave the computer user an option to acquire and install the located software.

In prior art graphical operating environments, files and applications are opened into rectangular spaces on the screen that are called windows. There can be one or more windows open on the display screen, with one window being active at any given time. It is also the case that an operation may begin on the computer that must be completed before other operations can continue. These operations are typically called system modal operations. When a system modal operation is ongoing, a dialog window may appear informing the user that such an operation is underway. For example, a user may select to shut down the computer, prompting a window to appear confirming that the user desires to shutdown or restart the computer. At this point the user may not attempt to work in other windows until the user finishes with the shut down window. It can be frustrating to computer users if they do not know that a system modal operation is underway, and the window that does appear does not always effectively convey this information. In other words, a user may continue to click in areas outside of the system modal information window to attempt to continue processing in other open windows. The user can become frustrated when he or she is not allowed to perform these tasks. It would be desirable to more effectively draw to the user's attention to a particular system modal dialog window so that the user is informed that the user must wait or complete the system prompted dialog prior to continuing any other operations.

In prior art graphical operating systems, it is often the case that text is displayed within a rectangular window. It is also often the case that the text assigned to a particular area does not completely fit within the designated area. In these instances the prior art systems simply truncate the text so that it will fit in the space and provide an ellipses after the truncation. For example, a file name may be longer than the allotted space for the file name underneath an icon. The file name will therefore change from FILNAMETOOLONG.01 to FILENAM . . . The use of the ellipses also requires a certain amount of space. This limits the amount of text that is provided to the user and does not convey as much information as possible to the user. It would be desirable to provide a method and system as an alternative to the use of the ellipses that both conveys to the user that an amount of text has been truncated and that conveys as much text as possible to the computer user.

The use of color in graphical operating systems has been popular for many years. In the past, however, lower color images were used, such as sixteen color images or 256 color images. The use of lower color images is caused by the number of bits available. A sixteen color image requires four bits, while a two-hundred and fifty six color image requires eight bits. It is now possible to render "true color" images, using approximately sixteen million colors, because better graphics cards are available and are being used.

In the prior art graphical operating systems, there are many instances when a button is not available to the user for one reason or another. For example, the "cut" editing button may not be available to the user, because there has not been a selection made of any material to cut. Similarly, until a selection has been cut or copied, the "paste" button is not available to the user. Many other instances exist where buttons are available only at certain points in time, when prerequisite events have been satisfied. To convey the unavailability to the user, the buttons that are unavailable are displayed in a "disabled" state. In prior art graphical operating systems, the button was disabled my taking the color out of the bitmap associated with the button, by turning the image into a two color, black and white image. The shape of the button is also used to make the button appear disabled. The black pixels define a transparency, i.e. what in the image is not rendered. The white pixels are rendered as the system defined "highlight" color, and then the white pixels are slightly offset in the system defined "shadow" color. This uses the shape of the button or other item to define it in a group of other elements, while showing it disabled. In a true color image, however, shape is no longer used to define the object. As an example, an arrow in the non-true color environment is displayed as a single element that has a distinct arrow shape. In the true color environment, the arrow might be displayed inside of a circle. Thus, the shape of the button element would be a circle, not an arrow. If the prior art techniques for rendering a disabled appearance were used, the appearance of the arrow would be completely lost, and the user would see only a disabled circle. The computer user would then be very likely to become confused as to the function of the disabled button. It would therefore be desirable to provide a method and system capable of effectively rendering a true color element on a graphical operating system to convey that the element is disabled.

In more recent graphical operating systems, there are many "idle-time" or background tasks whose execution is controlled by the operating system. For example, a disk layout optimizer may be executed as a background task. In the prior art operating systems, the methods used to determine when such background tasks are scheduled are relatively crude heuristics. As such, the background tasks will sometimes not be scheduled quickly enough, and will sometimes be scheduled too aggressively. In either instance, the scheduling may interfere with the primary or foreground task of the user. It would thus be beneficial to provide a method and system that allowed background tasks to be more effectively scheduled, such that the tasks are executed as early as possible without interfering with the other work of the user.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention provides a computer system with features designed to enhance the overall experience of the user interacting with the computer system. Prior to a detailed explanation of each of the features, an exemplary operating environment for the present invention is described below.

Exemplary Operating Environment

Figure 1:
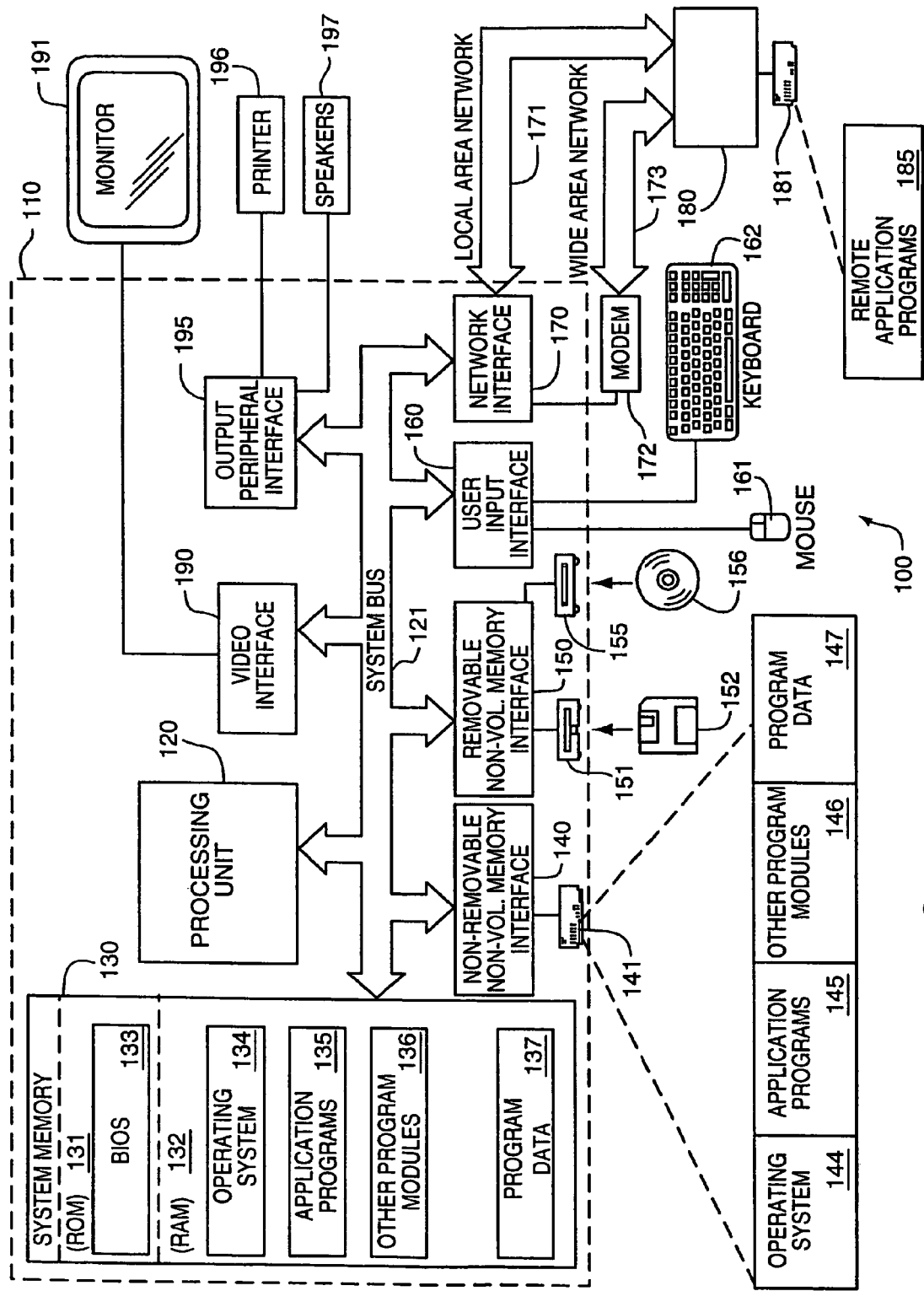
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

System for Desktop Clean-Up

As stated above, the display in a graphical operating system often presents users with what is known as a desktop. As users add application programs to the storage area of the computer, they may create what is known as a desktop shortcut. This action adds an icon to the desktop that may be double-clicked by the user to initiate the application, a text or data file, or a Web page. As users personalize the desktop by using it as a space for their shortcuts, the desktop can become cluttered with shortcuts that are unused for long periods of time. The goal of personalization is thus lost as the desktop becomes filled with items that are irrelevant to the user on most occasions.

Figure 2:
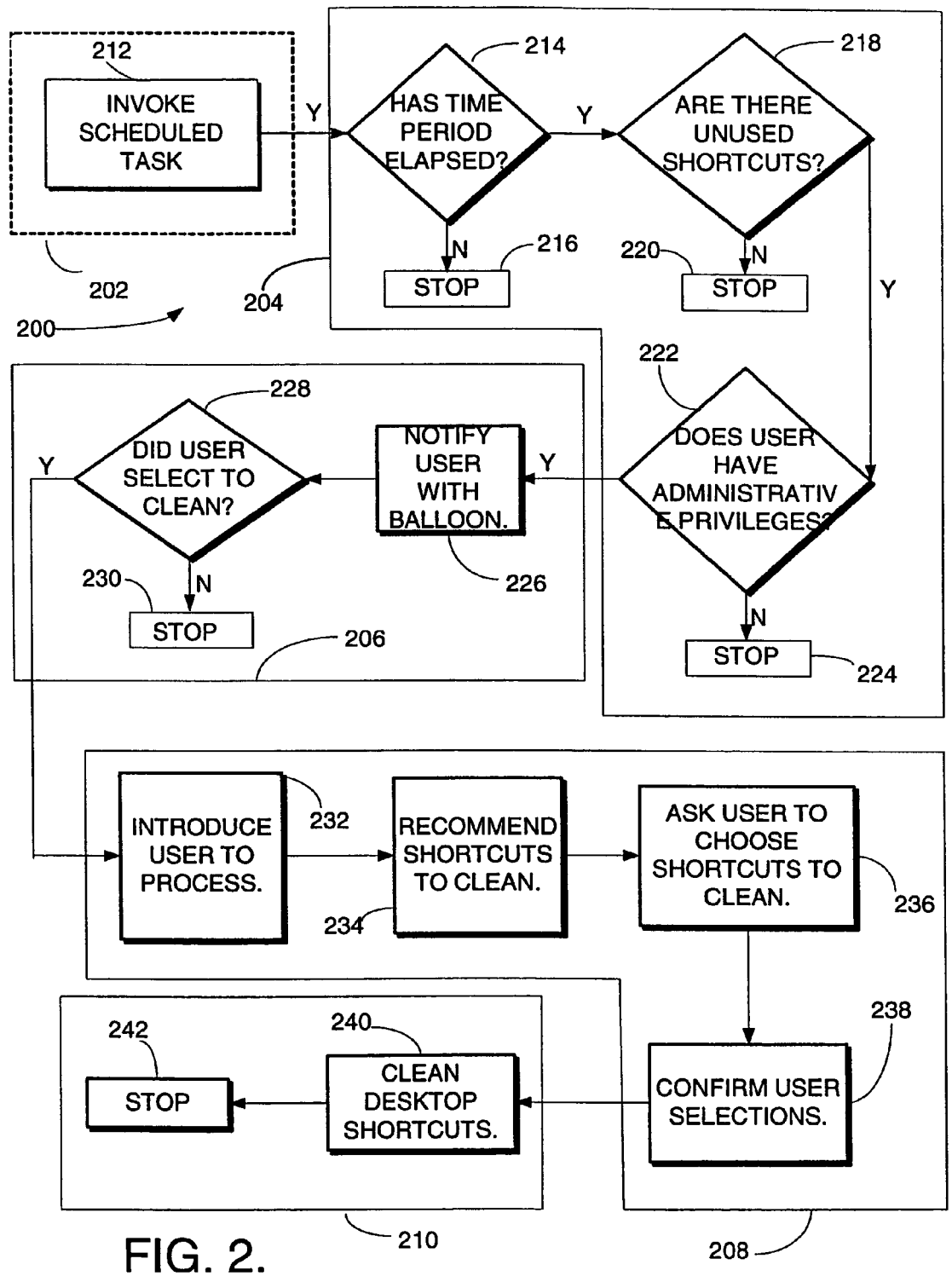
FIG. 2 is a flow diagram for one feature of the present invention.

A system is provided for cleaning the desktop of unused shortcuts, and is described with reference to FIG. 2. As seen in FIG. 2, the system for cleaning is labeled broadly as 200. System 200 may also be referred to as a wizard. A wizard is an interactive help utility that guides the user through each step of a particular task. System 200 includes a scheduler 202, a decision module 204, a notification system 206, a selection interface 208 and a cleaning engine 210. Scheduler 202 is used to schedule a task with the operating system on a regular basis, such as once per day. This is an instruction to invoke the remainder of system 200 on the basis scheduled, so that in the example given the system 200 is invoked once per day. The decision module 204 broadly determines whether some initial prerequisites have been satisfied prior to notification of the user about any cleaning functions. The notification system 206 notifies the user of the computer of any unused items and monitors for inputs from the user as to whether further action is desired. The selection interface 208 presents information to the user about unused items on the computer and determines, from user input, whether the user desires to clean up certain of the unused items. Finally, the cleaning engine 210 is responsible for carrying out any cleaning instructions received from the user.

The method associated with system 200 is also shown in FIG. 2. The method begins with scheduler 202, by invoking a scheduled task on a predetermined regular schedule, such as once per day, as shown at 212. Although the task of cleaning does not need to be run each day, the task is invoked each day in step 212 to preclude the user from missing the opportunity to clean the desktop if the user has not logged into the computer on any particular day. In other words, by invoking the scheduled task each day, the user is guaranteed the opportunity to clean the desktop, irrespective of the frequency that he or she logs into the computer.

After step 212, the method leaves scheduler 202 and proceeds to decision module 204. Within decision module 204, the method next determines whether a predetermined amount of time has elapsed since the wizard 200 last ran, as shown at 214. In the example given, the amount of time set is sixty days. The time period set could be any of a number of different time periods. The time period set is merely a decision on how often the user's desktop may need cleaning, while at the same time not seeming intrusive to the user. If the predetermined amount of time has not passed, the process stops as shown at 216, and no further action is taken. If the predetermined amount of time has passed, the process continues within decision module 204 by determining whether there are any unused shortcut items on the desktop, as shown at 218. This process involves checking to see if any of the shortcut items on the desktop have been unused for the time period involved in step 214. If there are no unused shortcut items on the desktop, the process stops, as shown at 220 and no further action is taken. If, however, there is at least one unused item on the desktop, the process continues within decision module 204 by determining whether the particular user has administrative privileges to run the clean up wizard 200, as shown in decision box 222. It could be the case that different users operate one computer, and that some of the users have certain administrative privileges, while others do not. For example, in a home environment, it could be the case that one or more adults within the house have administrative privileges on the computer, while any children users do not have such privileges. If it is determined at 222 that the current user does not have administrative privileges, the process stops, as shown at 224 and no further action is taken. If the user is determined to have administrative privileges to run the wizard 200, the method proceeds to the notification system 206.

Within notification system 206, the method proceeds by notifying the user of the cleaning option, as shown at 226. This notification may be accomplished with what is known as a "balloon tip." A balloon tip is simply a tip or question to the user of the computer that some action may be taken. The text of the tip or question is contained within a dialog balloon. For example, a dialog balloon is displayed at step 226 that says "There are unused icons on your desktop. Click here if you would like to clean your desktop." The process continues by monitoring the balloon tip to determine if the user chooses to run the wizard by clicking on the balloon tip, as shown at step 228. If the user does not choose to run the wizard 200 and clean the desktop, the process stops and no further action is taken, as shown at step 230. If the user does choose to clean the desktop, the process continues by moving to the selection interface 208. While the notification system 206 has been described in connection with the display and monitoring of a balloon tip, it should be understood that other forms of communicating the option of cleaning the desktop could be used and are within the scope of this invention.

If the user chooses to proceed in cleaning the desktop, the process continues in the selection interface 208 by first introducing the user to the cleaning process, as shown at 232. This step simply introduces the wizard 200 and describes to the user what the upcoming screens will do. The process then proceeds to 234 where the user is presented with a list of all of the shortcuts on the desktop at the current time. Each shortcut is listed along with the most recent time it was used, giving the user the information needed to decide whether to keep a shortcut, or have it cleaned. The user is then asked in step 236 to select which shortcuts are desired to be cleaned up. In a preferred embodiment, each shortcut is provided on a display screen, along with a corresponding checkbox. The user can indicate within the checkbox whether the shortcut is one which is desired to be cleaned, or can be left blank to indicate that the shortcut should be left on the desktop. The wizard 200 also makes recommendations to the user in step 234 by pre-selecting those checkboxes corresponding to shortcuts that have not been used within the earlier defined predetermined amount of time, such as sixty days. If the user chooses to continue without changing the default recommendations, all shortcuts that have not been used in the last sixty days will be cleaned up and removed from the desktop. Before executing the cleaning engine 210, the user is asked to confirm the selections to clean at step 238. A list of all shortcuts the user has selected for cleaning is presented and the user is given the opportunity to go back and change the list if desired. This provides the user an additional opportunity to double-check the items which have been selected for cleaning, prior to removing them from the desktop. After the user confirms the selections, the process continues and proceeds to the cleaning engine 210.

The cleaning engine 210 is then invoked at step 240, which cleans the shortcuts selected by the user from the desktop, after which the process stops as shown at 242. The cleaning engine operates by taking as input a list of shortcuts to clean and remove from the desktop. The shortcuts are then moved by the cleaning engine 210 to a folder on the desktop created for the unused desktop shortcuts. As an example, the folder may be called "unused desktop shortcuts." This allows the user to find the shortcuts that have been cleaned if the user has that desire, while still reducing the clutter on the desktop.

Within the WINDOWS brand operating software from Microsoft Corporation of Redmond, Wash., at the present time, there are two basic types of shortcuts that can be cleaned from the desktop. The first is a shortcut having an extension .LNK. This shortcut is an icon with a shortcut arrow. This first type of shortcut is moved by the cleaning engine 210 to the unused desktop shortcuts folder that exists on the desktop.

The second type of shortcut is what is known as a "regitem" shortcut. These regitem shortcuts are immobile in that they cannot be removed from the desktop. In order to achieve the goal of cleaning the desktop, these regitem shortcuts must be hidden in some fashion. The first step is to create a secondary or "fake" regitem by using the GUID extension format within the unused desktop shortcuts folder. This produces a file in the unused desktop shortcuts folder that looks and acts like the regitem shortcut from the desktop, but which can be moved anywhere. The real regitem shortcut on the desktop is then hidden from view, so that it does not appear on the desktop. This achieves the result of cleaning the desktop. At each launch of the wizard 200, the cleaning engine 210 determines if any of the fake regitems from the unused desktop folder have been moved back to the desktop by the user. If this has happened, the regitem that was hidden on the desktop is revealed and the fake regitem is deleted.

As an example of the wizard 200 in action, assume that the user has used the computer for a number of years and over that period of time the desktop of the computer has become cluttered with shortcuts. It never occurs to the user to clean the desktop, so the user continues to visually hunt through the sea of icons whenever she needs to find anything. Now assume that the user installs or upgrades to an operating system containing the wizard 200 or installs the wizard 200. Now if the user logs onto the computer, a balloon tip appears on the display of the computer and points out that "There are unused icons on your desktop. Click here to clean up the desktop." The user then can click within the balloon tip to clean the desktop.

The wizard 200 then presents a page describing the behavior of the wizard, followed by a presentation of a list of all the shortcuts on the user's desktop, and the last time that each shortcut was used. The user can immediately see the items still used by the recommendations of the wizard, and also sees the shortcuts that have not been used in some time. If the user confirms the recommendations, the selection interface 208 of the wizard asks the user to confirm the selections. Items that may be listed include shortcuts that no longer exist, shortcuts to programs that the user doesn't use anymore, and shortcuts to programs that were installed automatically but that the user has not used in some time.

The cleaning engine 210 of the wizard then cleans the desktop of the selected shortcuts. After executing wizard 200, the user is presented with a desktop having shortcuts that are known and used by the computer user. Therefore, the user can find the items that are desired quickly and easily.

Exposing Common Tasks

As stated above, the ease of use of a computer system is dramatically improved by the use of a graphical operating environment. Even further usability is accomplished by a system and method that allows users to more easily identify tasks or commands that are available for a given state or selection within the graphical operating environment. Typically, a user will need to have knowledge of the operations or tasks that can be accomplished with particular objects or selections, such as files or folders. In other situations, the user will have to take other actions such as 'right clicking' on an object, in order to discover available task options. In the case of files on a computing system, the naming structure, particularly the filename extension, provides an indication to the user of the available task options for managing particular files or the use thereof. The goal of exposed file tasks, a feature of the present invention, is thus to transcend file name space and provide a high level of usability in the management of files, by providing dynamic context sensitive lists of tasks that are applicable to selected object types.

Figure 3A:
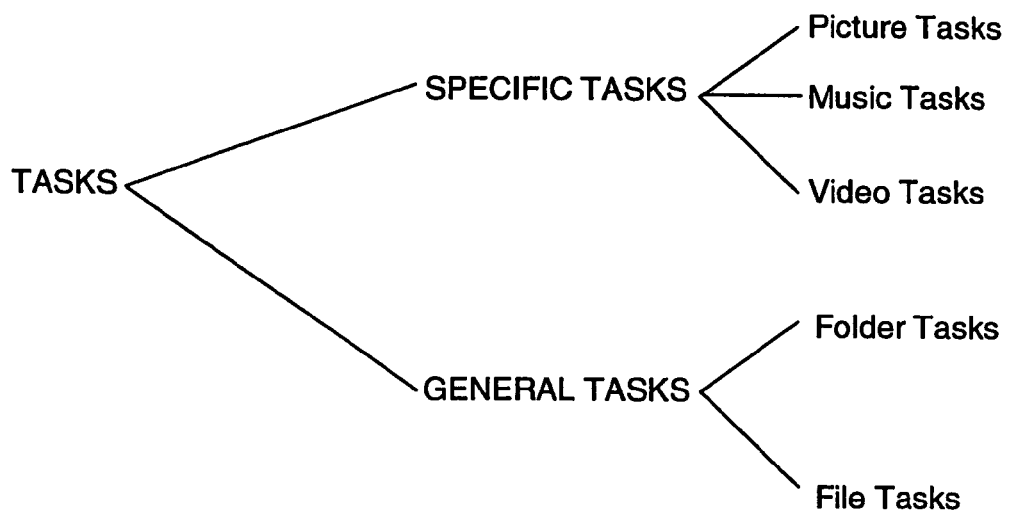
FIG. 3A is a schematic demonstrating the types of tasks.

A system is provided for exposing a set of file and folder tasks, and is described with reference to FIGS. 3A, 3B and 3C. As seen in FIG. 3A, the tasks that can be performed on an object in a computing environment can be described as specific tasks or general tasks. A specific task is one that is uniquely well suited to a particular object based on the object's characteristics. As illustrated in FIG. 3A, Picture tasks, Music tasks and Video tasks are considered specific tasks, because the associated tasks for objects of each type are closely tied to the characteristics or definition of the object. For example, a music task option such as, 'playing selection' or shopping for music online are closely tied to operations that relate to music as opposed to a picture or other objects. A general task is one that is applicable to a grouping or class of objects of a particular type. For example, file tasks and folder tasks as illustrated in FIG. 3A are applicable to all specific task objects. In other words, to the extent that a picture object, music object or video object is stored electronically to a medium, that object will be stored in one or more files, within one or more folders. As such, every one of those object types will have file and folder tasks in common.

Figures 3B, 3C:
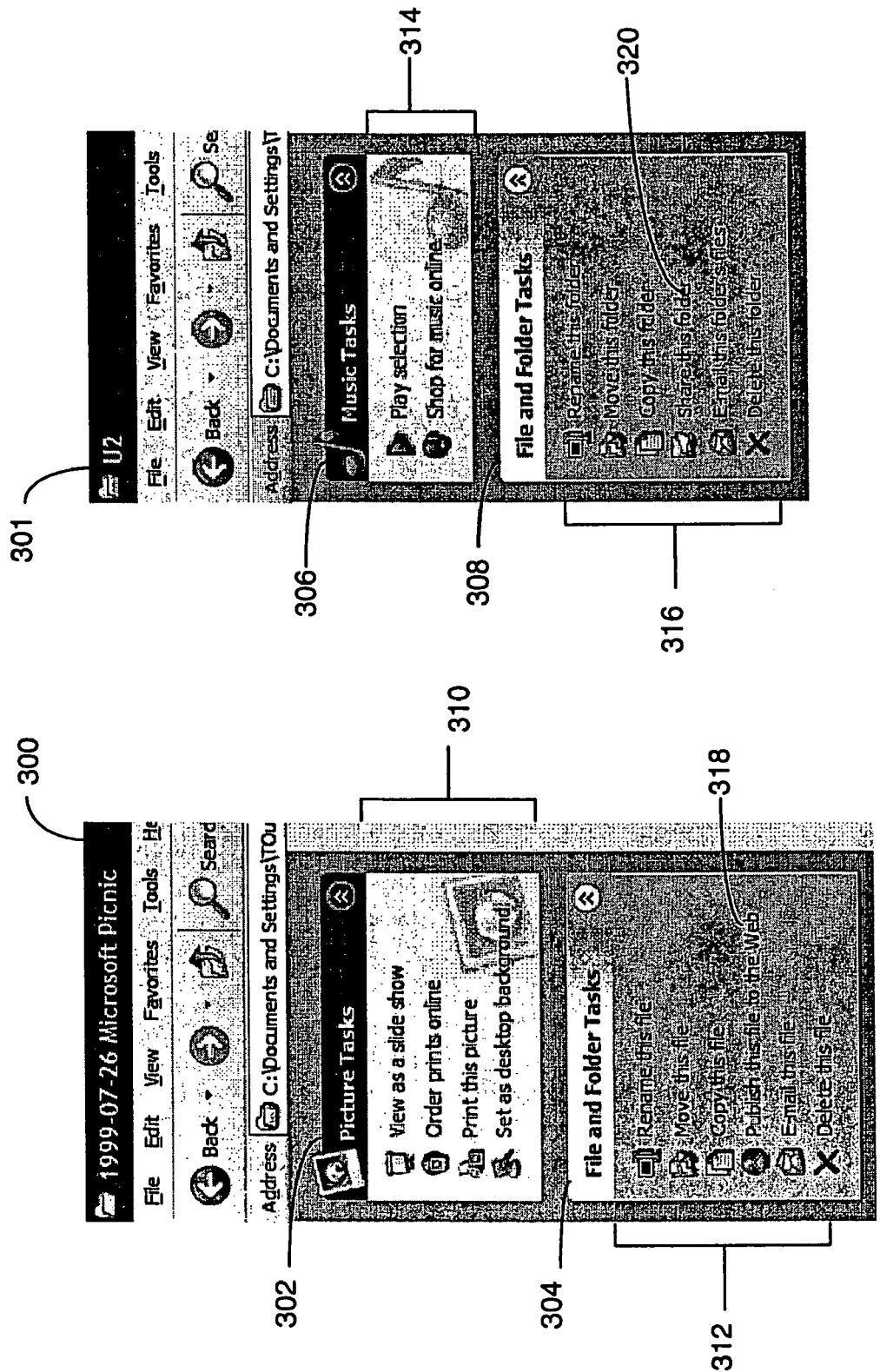
FIG. 3B is a partial screen shot representing one feature of the present invention.
FIG. 3C is a partial screen shot representing one feature of the present invention.

These concepts are more clearly illustrated in FIGS. 3B and 3C. In FIG. 3B, a portion of a screen shot 300 where a user has selected a picture file within a picture folder, is shown. In FIG. 3C, a portion of a screen shot 301 where a user has selected a music folder, is shown. The transformation of exposed tasks depends on the state of user interaction. For instance, when no selection of a file or folder item is made by a user, the task list of options available for the folder with the current focus will be displayed. On the other hand, when a single item is selected, the displayed task list will change to display a menu of available tasks for the selected item. If multiple items are selected by a user, a task list of exposed commands that are enabled and common to all of the selected items will be displayed. This dynamic context sensitive list of tasks that was just described will also display appropriate tasks in plural form. For example, a task item displayed as 'Move this file' will be changed to the correct tense of 'Move these items', when multiple items are selected.

Returning to FIG. 3B, as previously stated, the illustrated task list results from a user's selection of a picture file. As such, the specific task list 'Picture Tasks' 302 is displayed along with a general task list 'File and Folder Tasks' 304. Picture Tasks 302 is a list of hyperlinks to tasks that are appropriate for a picture type file object, which are collectively labeled as 310. General task list 'File and Folder Tasks' 304 is shown because the selected object in this case, a picture file, is a file object and thus the list of hyperlink tasks 312 respecting files are applicable. Turning to FIG. 3C, the illustrated screen shot 301 results from a user's selection of a music folder. As such, the specific task list 'Music Tasks' 306 is displayed, along with a general task list 'File and Folder Tasks' 308. Music Tasks 306 is a list of hyperlinks to tasks that are appropriate for a music folder type object, which are collectively labeled as 314. The general task 'File and Folder Tasks' 308 is shown because the selected object, a music folder, is a folder object and thus a list of hyperlink tasks 316 respecting folders will be applicable.

The present invention also provides intuitive task-oriented access points for particular contexts such as file or folder contexts. This concept is particularly illustrated in FIGS. 3B and 3C, where as shown, the list of tasks 312, 316 relating to File and Folder tasks 304, 308 are different because of the difference in context of the users selection i.e. a file versus a folder. Respecting the lists of tasks 312, there is a selectable option to publish 318, with regards to the file and folder tasks 304. Conversely, there is a selectable option to share 320 in the file and folder tasks 308 of the list of tasks 316. In addition, the text associated with similar options, which are contained within both illustrations, are consistent with the context of the user selected object. For example, screen 300 illustrates a user selected object of a file and as such, the 'rename' option is displayed as 'Rename this file', as opposed to screen 301 where the user selected object is a folder and the corresponding option is displayed as 'Rename this folder'.

Notification of Newly Installed Applications

Computer users may from time to time install new applications on the computer. For example, a computer user may install a new computer game onto the computer. Unless the user creates a desktop shortcut to the game, to access the newly installed game the user must access the file system, then the programs folder, then the games folder, which will expose the newly installed game. This process is less than intuitive and can obscure the newly installed application from the user, thereby causing frustration to the user and limiting the user's ability to properly utilize the newly installed application. One aspect of the present invention provides a method and system designed to remove barriers between users and their newly installed applications.

Figure 4:
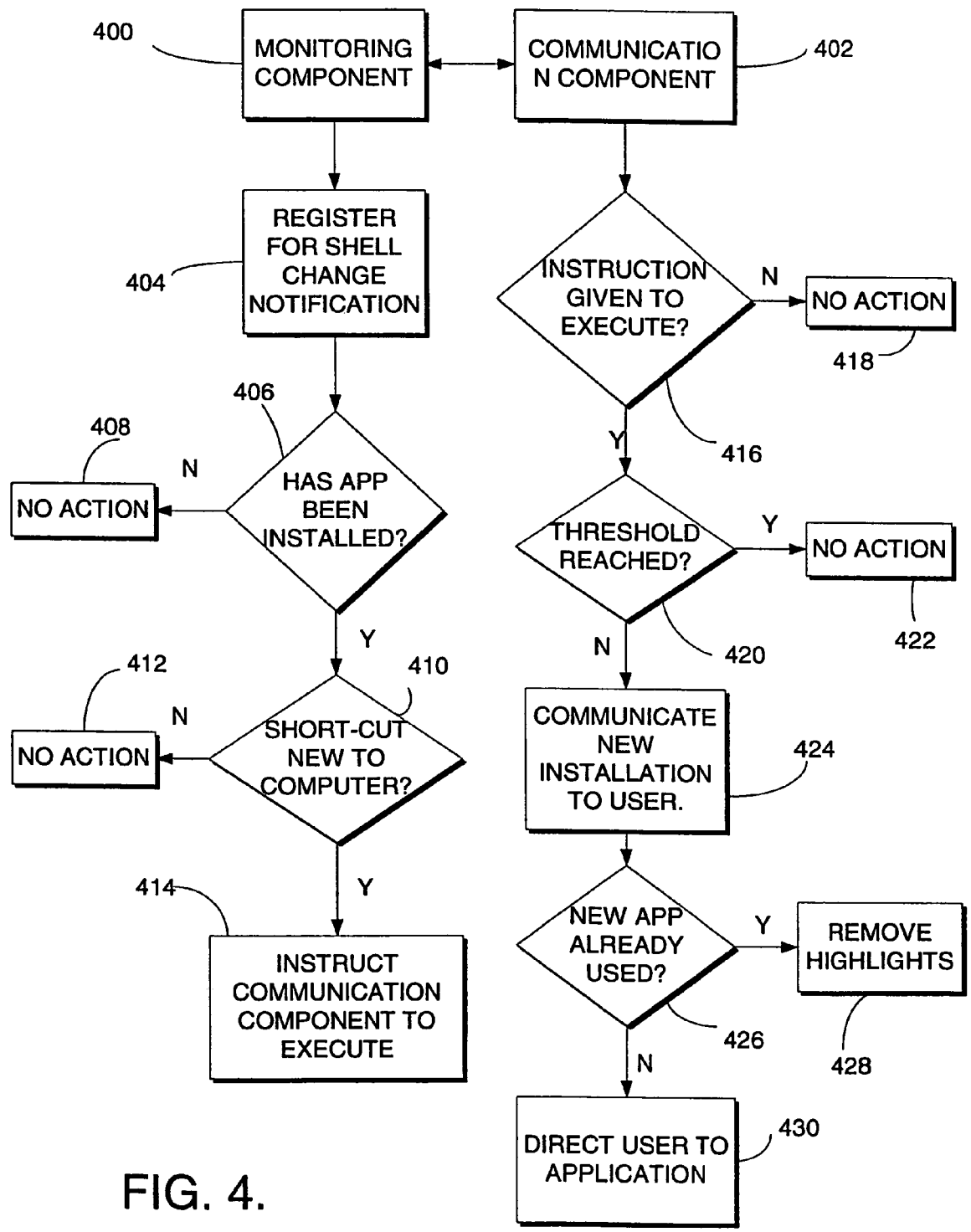
FIG. 4 is a flow diagram for one feature of the present invention.

The method and system are explained with reference to FIG. 4. As can be seen in FIG. 4, the system has a monitoring component 400 and a communication component 402. The monitoring component administers the process of determining whether new applications have been installed on a user's computer. Once it has been determined that a new application has been installed on the computer, the monitoring component 400 informs the communication component 402. The communication component 402 is responsible for communicating to the user that a new application has been installed on the computer, as well as determining when the communication about the newly installed application can stop.

With continued reference to FIG. 4, the method used by the monitoring component 400 begins with the monitoring component 400 registering with the operating system to receive information about newly installed applications at step 404. For example, in the WINDOWS operating software from Microsoft Corporation of Redmond, Wash., the monitoring component 400 registers with the operating system to receive shell change notifications. The method continues after registration by determining whether an application has been installed at step 406. If an application has not been installed, the process stops, as shown at 408. One method for detecting the installation of an application is to monitor the system to determine if any shortcuts corresponding to the application have been created. When a notification corresponding to the registration information is executed, or when the system starts up, the shortcuts are inspected to determine whether they correspond to an application. Typically, shortcuts having a file extension of .EXE or that have an MSI package correspond to applications. If multiple shortcuts exist that point to the same application, the multiple shortcuts are collapsed or combined into one.

After it has been determined that an application has been installed, the process continues by determining whether the shortcut that has been detected is associated with a new application, as shown in FIG. 4 at 410. If a shortcut is determined to point to an application, the installation time of the application time is computed. One method for computing the application installation time is to determine the creation timestamp of the executable associated with the application. This works well in most instances. Another method is to inspect the creation time of the directory containing the application. This approach avoids the problem created if applications create an executable with a creation timestamp different from the installation time. Shortcuts that have been created that are associated with an application that has been installed on the computer for more that a predetermined amount of time are considered to be associated with an application that is not new. In such a case, the process stops, as shown at 412. For example, to avoid false positives, shortcuts that are created for files that are more than one week old are ignored. This avoids informing a user that a new application has been installed, when the user has merely created a shortcut to a pre-existing application on the computer. If the shortcut has been created within the predetermined amount of time, the process continues with the monitoring component 400 informing the communication component to execute, as shown at 414.

The communication component 402 monitors to determine if it has been given instructions to execute, as shown at 416. If no instruction has been given, no action is taken as shown at 418. If instructions have been received to execute, the process then determines whether the user has previously been informed of the newly installed applications a predetermined threshold number of times, as shown at 420. If the threshold has been reached, no further action is taken as shown at 422. For example, the predetermined threshold is set to three and the process monitors, at 420, to determine if the user has already been informed three times of the newly installed application. If the user has already been informed three times, no further action is taken. The threshold number is determined to be a balance between properly informing the user of the new application and not annoying the user with messages that are repetitive.

If the threshold number has not yet been met, the fact that an application has been installed is communicated to the user as shown at 424. This is typically done with a balloon style notification. The balloon tip points to the programs directory and indicates "new programs installed." Each level of the hierarchical directory containing the program is then highlighted in some fashion, such as the use of a different color text. In other words, if the program is installed in the Start menu/programs/games folder, each of the Start menu, programs and games folder is highlighted to guide the user through the hierarchy in finding the newly installed application. The process determines whether the user has already used or opened the newly installed application, as shown at 426. If the user has already used or opened the newly installed application, the highlighting is removed, as shown at 428. Because the user has already used the newly installed application, the user is not benefited by further guidance to the application. If the user has not yet used the newly installed application, the highlighting is used to direct the user to the newly installed application as shown at 430.

As an example, if a user installs a new game onto the computer, the game can install a shortcut to itself in a folder Start menu/programs/games by creating a new folder with the software vendor's name on the folder. Prior to the invention, the user would have to navigate down four levels of the hierarchy to find the newly installed application. Using the invention, after the game is installed the user is informed, upon clicking the start menu, by a balloon tip pointing to the all programs list saying "New programs installed." When the user clicks all programs, they see a highlighting behind the games folder. When the user clicks the games folder, they see a highlighting behind the new vendor folder. When the user clicks the new vendor folder they see a highlighting behind the newly installed game itself. Through the highlighting, the user is guided directly to the newly installed application. It should be understood that other methods of communication beyond highlighting are within the scope of the invention as well. For example, successive balloon tips could be displayed informing the user "Click here to see newly installed applications" for each level of the hierarchy.

The invention can thus be used to inform computer users of newly installed applications on their computer. The users can also be guided to these newly installed applications, thus better informing computer users of the applications and their whereabouts on the computer.

Filmstrip View for Images

As stated above, the need to readily identify items that are stored in a computing environment such as a PC is dramatically increasing, as more individuals utilize the PC in their daily routines and as the types of stored information varies between pictures, music, documents and so on. In particular, with respect to digital pictures, users traditionally have to invoke a third-party software program in order to view a specific file on the PC. A system and method are provided to allow users to more readily view and identify the image associated with a given file within the graphical operating environment. The goal of film strip view, a feature of the present invention, is thus to alleviate the need for other software programs when browsing a folder of pictures, by providing a quick iterative process that allows a user to preview a sizeable image of one or more picture files within the folder.

Figure 5A:
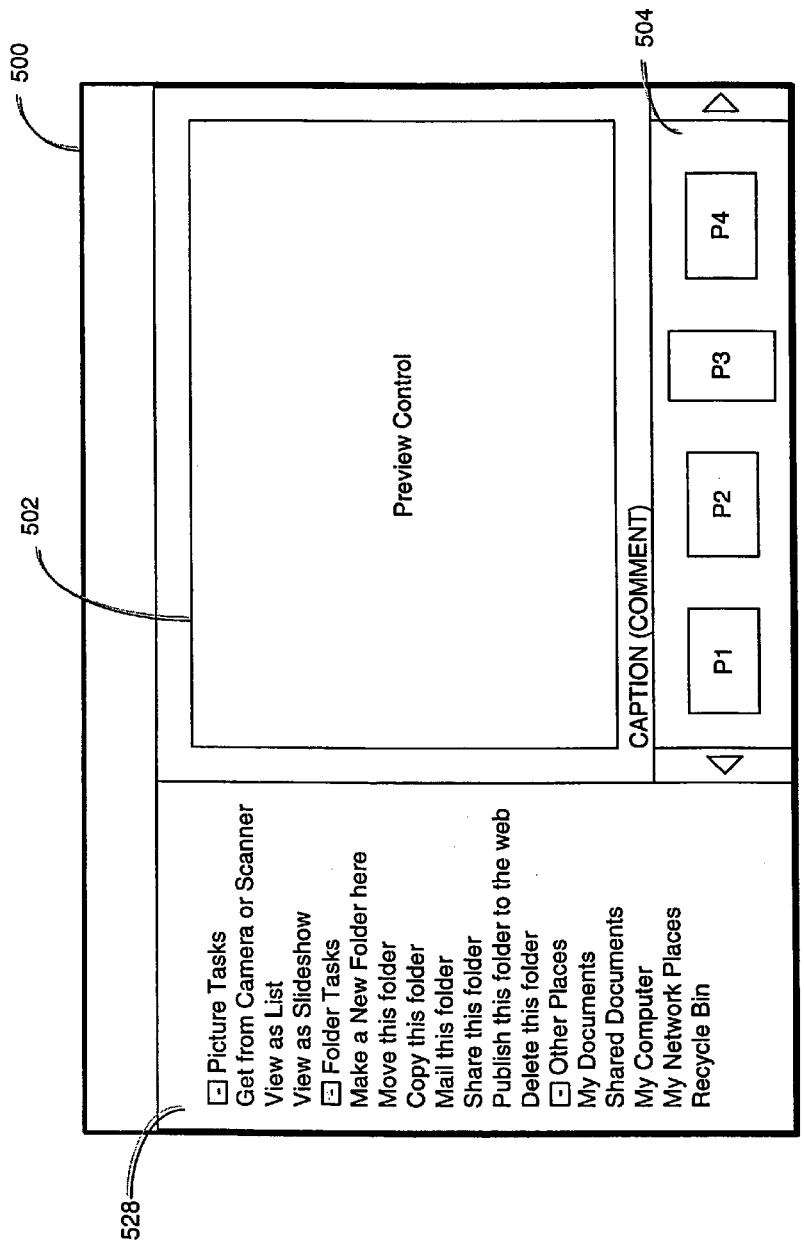
FIG. 5A is a schematic representation of a user interface for one feature of the present invention.

A system is provided for browsing pictures stored in a folder, and is described with reference to FIGS. 5A, 5B and 5C. In brief, the system and method of the present invention presents a series of folder pictures as a single row of thumbnails, within an environment that is utilized for viewing other non-pictorial files and folders, e.g. Windows Explorer from Microsoft Corporation. It further allows a user to selectively cursor through the thumbnails, as it displays an enlarged preview image of a user selected thumbnail. FIG. 5A is a diagram of a representative window on a user's screen. As shown, the window 500 is divided into several areas including a header region, a task options area 528, a preview control area 502, a caption or comment area and a filmstrip area 504. The task option area 528 contains a list of tasks that can be selected by a user in order to perform a wide variety of operations relating to the management of files and folders, as well as other system choices. Some of these operations are specific to the pictures in the filmstrip area 504 and the preview control area 502. The preview control area 502 is a space in which an enlarged preview image of a user selected picture will be displayed. This space can also contain navigational icons to assist a user in iterating through a series of pictures. Immediately below the preview control area is a caption or comment area that can be utilized to display a variety of textual information. A film strip area 504, provides a space to display a single row of thumbnail images p1, p2, p3, p4 of the picture files contained within a given folder. In addition, the film strip area 504 also contains cursors to allow a user to scroll through a folder for the picture files. It should be noted that the filmstrip area 504 can contain and display thumbnail images in mixed orientation. For instance, as shown in FIG. 5A, p1, p2 and p4 are in landscape while p3 is in portrait.

Figure 5B:
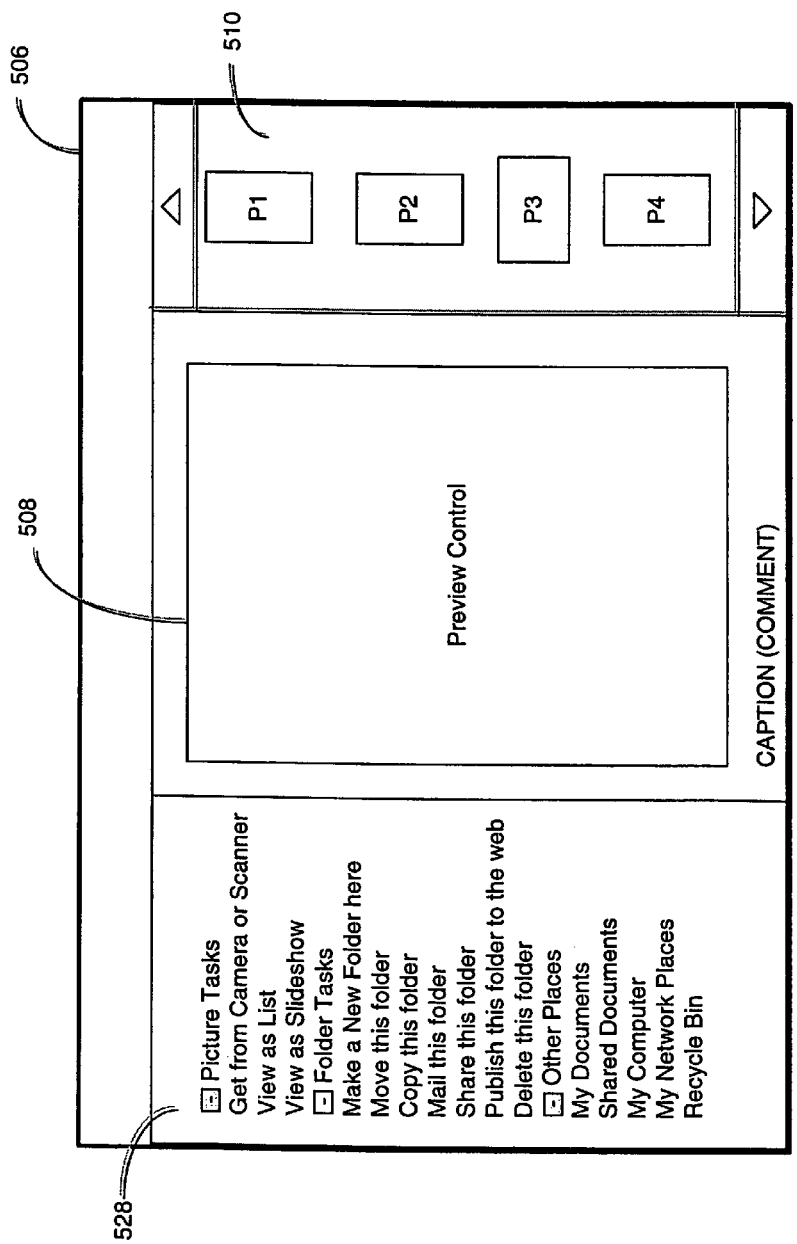
FIG. 5B is a view similar to FIG. 5A showing a different layout.
Figure 5C:
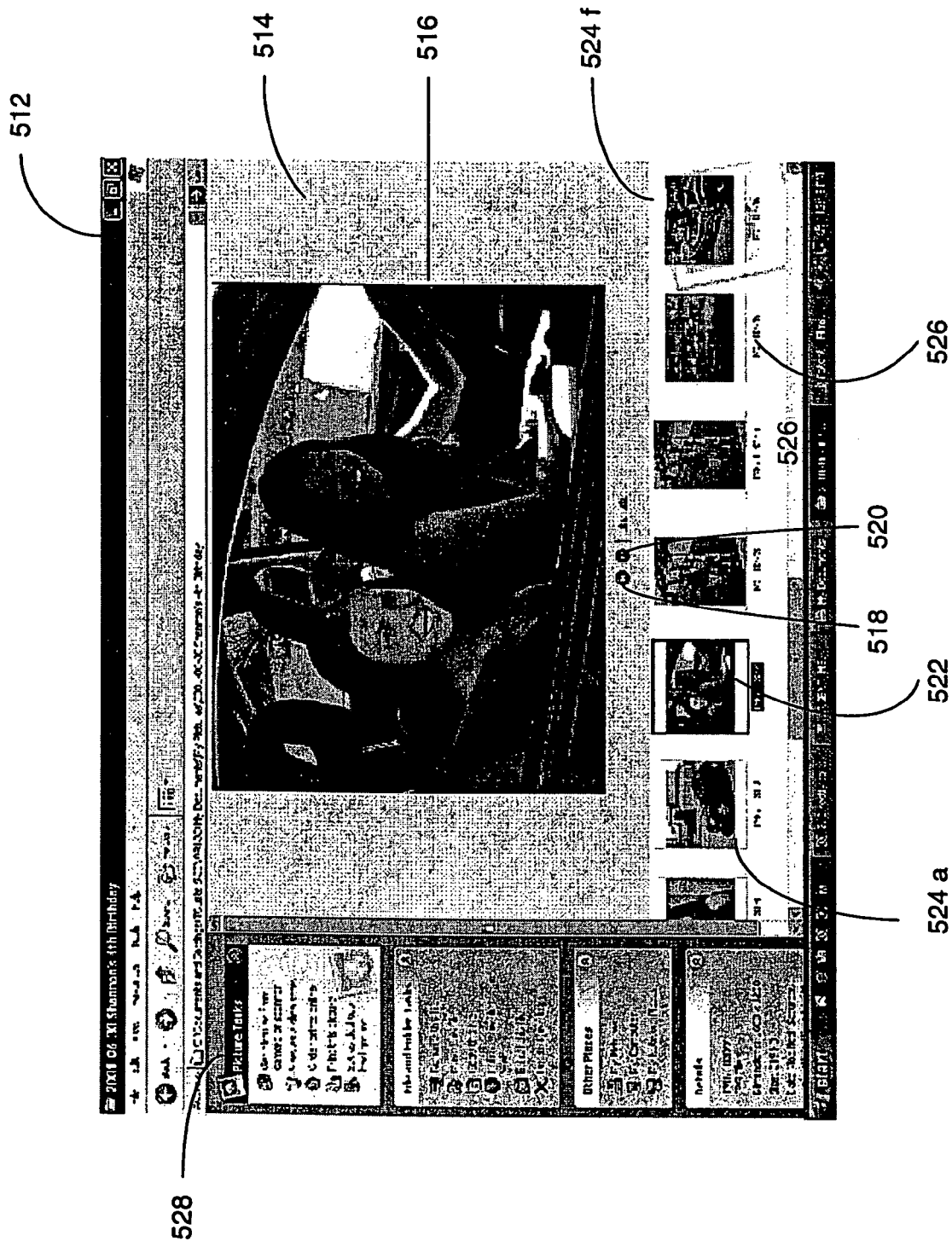
FIG. 5C is a screen shot demonstrating one feature of the present invention.

FIG. 5B is a diagram with a different view of a representative window on a user's screen. This diagram is essentially identical to FIG. 5A, with the exception that the preview control area 508 is shown in portrait view and consequently, the film strip area 510 is shown in a vertical orientation along the right side of the window 506. The task options area 528 remains in the same area of the window 506. It should be noted that the user's screen will alternate between the illustrations of FIGS. 5A and 5B, as the user selectively iterates through mixed thumbnail orientations that are shown in the filmstrip area 504, 510 of the respective window 500, 506.

The more salient features of the present invention with regards to filmstrip view can best be described with reference to the illustrative screen capture, shown in FIG. 5C. The screen capture 512 displays in detail a task/link area 528, a preview control area 514, an enlarged preview picture 516, multiple thumbnail images 524a-524f collectively referred to as 524, multiple image filenames 526 and navigational control buttons 518, 520. As previously stated, a single row of thumbnail images 524 resembling a filmstrip are shown across the bottom of the window 512. A user can select any one of the thumbnail images 524, as illustrated by user thumbnail selection 522. The effect of user thumbnail selection 522, is to cause a larger preview image 516 of the user thumbnail selection 522 image to be displayed within the preview control area 514. In addition, user selection of a thumbnail image will also allow the user to select and perform any one of the tasks listed in the task/link area 528, with respect to the selected image. The control button 518 allows a user to quickly and successively preview an enlarged image 516 of each of the thumbnail images 524 within a given folder, by iterating in one direction. In other words, a user would not have to specifically 'click' on each and every successive thumbnail image 524 in order to preview the picture. Instead the user will merely click on the control button 518 repeatedly to move through the folder. The control button 520 performs a similar iteration function but only in the opposite direction.

As previously discussed, images within a folder are actually stored and identified by a filename. As shown, the filename 526 for any of the displayed thumbnails 524 is also shown as part of the filmstrip view. Filmstrip viewing is primarily applicable to, and the default view for folders that contain a few images. In an embodiment of the present invention, the upper limit for the number of images within a folder that will be cause the folder to be displayed as a filmstrip view is 24.

File Association and Application Retrieval

As stated above, the need to adequately match file types to applications in a computing environment has become more of a priority as more non-technical individuals utilize the PC. File types are typically indicated by the extension on a file name, such as ".ZIP" for Zip compressed files or ".PDF" for Adobe Postscript Data files. An attempt to open a particular file requires that the user is either familiar enough with the file extension, so as to identify the appropriate application program, or that the file extension has been previously associated with the proper application program during the installation of the application. A system and method are provided to allow users to locate and appropriately associate application programs with file types that the user may be trying to access on a PC. The goal of '.Net file association', a feature of the present invention, is thus to alleviate the need for users to manually locate software that will enable them to access the content of files.

A system and method are provided for locating application program files in a networked computing environment such as the Internet, and is described with reference to FIGS. 6A and 6B. In brief, the system and method of the present invention automates the process of finding software that a user may need to open a file. In effect, the present invention will launch a web browser on a user's computer, to access a web server when the operating system cannot find an application program to open a user selected file type. The web browser will then present the user with either a list of application(s) or information on where to search for relevant applications.

Figure 6A:
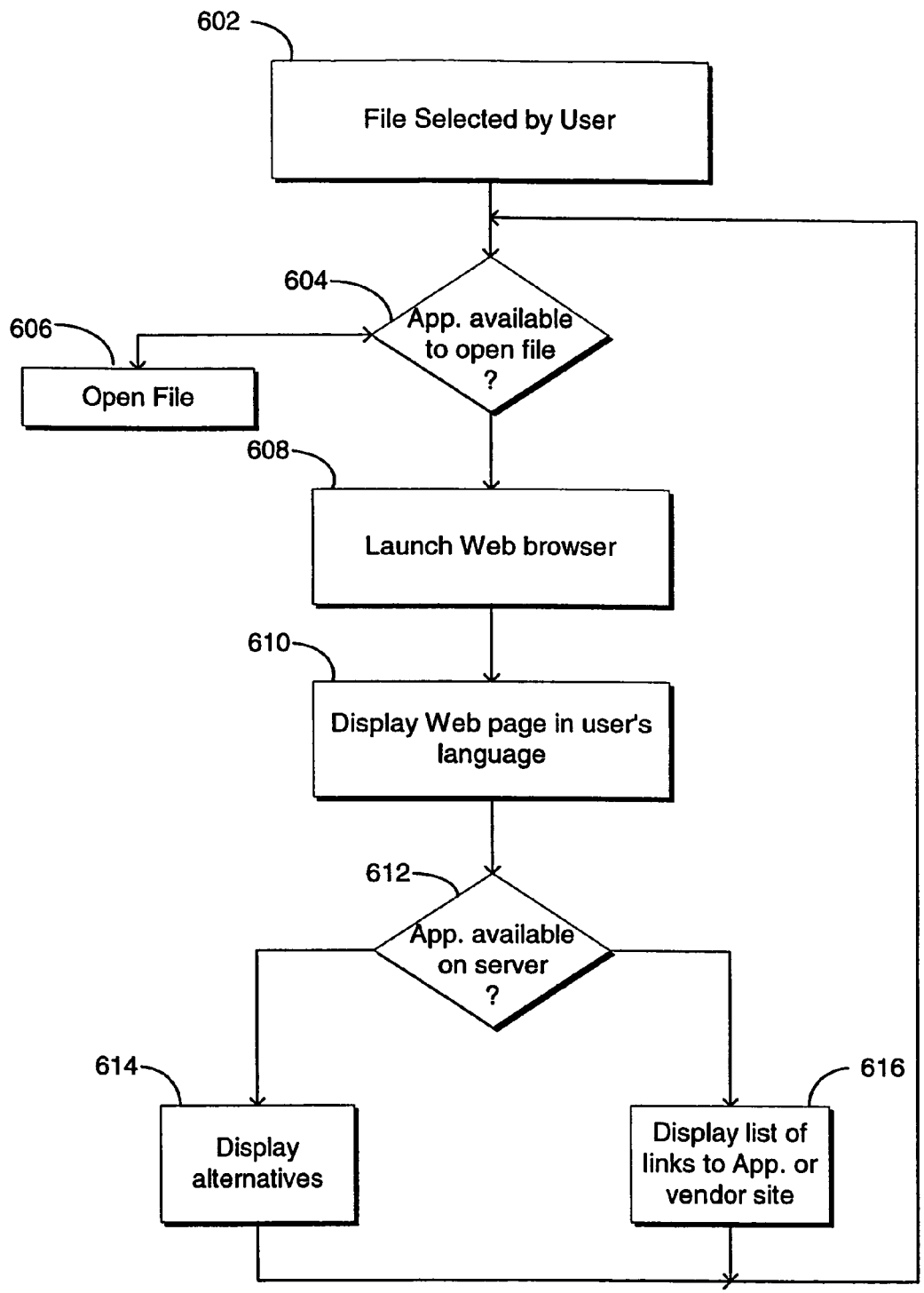
FIG. 6A is a flow diagram for one feature of the present invention.

FIG. 6A is a flow diagram of the steps 600 involved with the association of file types with application programs. Those skilled in the art would recognize that portions of these steps 600 can be performed on either a client computer or on a server computer. Initially, a user selects a file to view or edit, at step 602. A determination is then made by the operating system via a monitoring module or program, as to whether or not an application is locally available on the PC to open the selected file, at step 604. If the needed application is present, the file is opened and the process is terminated at step 606. On the other hand, if the needed application is not locally present, a web browser is launched at step 608, and a web page is displayed in the user's spoken language at step 610. The details of how these functions are accomplished can be found later in this document. If one or more software applications are available and can be readily identified by a server process in step 612, then a list of such applications and the links to obtain the programs are provided at step 616. However, if either the applicable software program cannot be identified or is not available, then information on possible alternative locations or sources for additional information are provided at step 614.

Figure 6B:
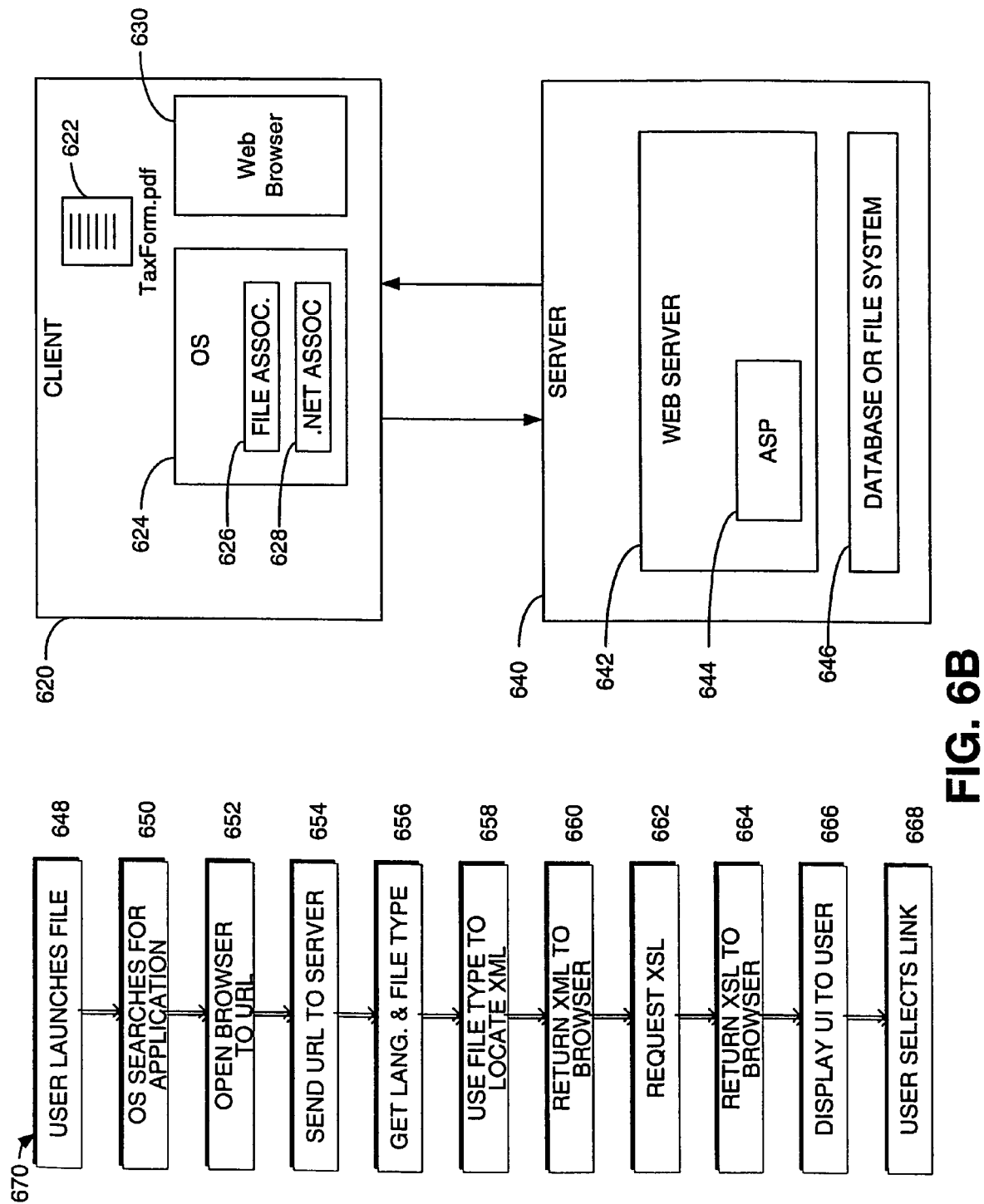
FIG. 6B is a flow diagram and block diagram for one feature of the present invention.

Having provided an overview of the functions of the .Net file association, we now turn to FIG. 6B, which is a block diagram of the component environment, along with the process steps for the implementation of an embodiment of the present invention. The system and method of the present invention is implemented in an environment that comprises a client component 620 and a server component 640, along with the indicated steps 670. A client component 620 as shown, includes a selected user's file 622, an operating system environment 624 within which there is a table of file associations 626 and a .Net file association module 628, and a web browser 630. A server component 640 includes, a web server 642 within which there is an Application Service Provider (ASP) module 644, and a database or other file system 646. All of the components identified thus far function to implement the steps 670, and will be discussed in conjunction therewith.

As previously stated, the process that initiates the .Net file association of the present invention is the action of a user selecting to open a file 622 at step 648. At step 650, the operating system 624 searches for installed software and file type associations, using the file association module 626. In the event that no association is found, the Net file association module 628 is invoked at step 652. This action causes a Uniform Resource Locator (URL) along with other information such as a file extension and user's language, to be sent to a known server 640, at step 654. The receipt of the URL causes the server 640 to utilize the ASP module 644 to obtain file extension and user language at step 656. A lookup of a table or similar operation is performed on a database 646 to obtain Extendend Markup Language (XML) data, at step 658. The XML data is returned in step 660, via Hyper Text Transfer Protocol (HTTP) to the web browser 630 on the client 620. Whereupon, the client's web browser 630 will receive the XML and will see an HTML Reference HREF XML attribute pointing to a Extensible Stylesheet Language (XSL) file in the <?xml-stylesheet> tag. As a result, the web browser 630 requests the XSL, at step 662. The server 640 returns the XSL in the form of an HTML page to the client 620 at step 664 and the web browser will then download the needed XSL, HTML, pictures and other files needed to create the user interface with HTML, at step 666.

As will be understood by those skilled in the art, the information provided to the user in the user interface will vary, but a current implementation of an embodiment of the present invention includes the following content:

1. File Extension (Example: ZIP)
2. File Format Description (Example: ZIP Compressed File Achieve)
3. Description (Example: This file is an achieve of one or more files compressed into a single file in order to make the file faster to transfer and easier to manage)
4. A list of hyperlinks to web sites to download the software. The hyperlink name will almost always include the manufacturer and the product name. Long lists of products maybe grouped by commercial product, shareware, and freeware.
5. Hyperlinks to other web sites (download sites, search engines, etc.)

Furthermore, the criteria to determine which set of information from the list above is displayed in the web browser 630 at step 666, varies depending on the type of file, i.e. the file extension. For instance, behavior and content of the web page may vary according to the file type (extension) that is selected by the user:—the page will depend on the following types of file:

1. Operating System or Application files (.asp, .chm, .dll): A web page will explain that the file is part of a program or a web server and that it can't be opened directly.
2. Popular Types (.gif, .mp3, .htm): The Operating System ships with handlers for these so normally these will always have associated applications. However, an uninstaller program will often leave the file type without an association. In this case, the web page may explain how to fix the association, provide programs, or a downloadable application that fixes the Operating System associations.
3. General File Types (.doc, .txt, xls, .ppt): These kinds of files can be opened in several application and thus a hyperlink can be provided to those applications.
4. Third Party Specific File Types (.pdb, .acad): These file types are proprietary and normally only one 3rd party application will open them. In this instance, the web page may describe the file, provide links to the 3d party web site, and explain that it is not a software program that can be made available.

After the appropriate information is displayed on client side 620 in the web browser 630, the user can pick a hyperlink that will best help them at step 668.

Information relating to the types of files that are sought by users, the frequency of those searches and other such information is logged on the server component and may be used for information feedback purposes, including but not limited to ways to improves searches, product development and so on.

Method of Communication Using Gradual Desaturation

Operations that must be completed before other operations can continue on a computer may be known as system modal operations. When a system modal operation is ongoing, a dialog window may appear informing the user that such an operation is underway. For example, a user may select to shut down the computer, prompting a window to appear confirming that the user desires to shutdown or restart the computer. At this point the user may not attempt to work in other windows until the user finishes with the shut down window. It can be frustrating to computer users if they do not know that a system modal operation is underway, and the window that does appear does not always effectively convey this information. In other words, a user may continue to click in areas outside of the system modal information window to attempt to continue processing in other windows. The user can become frustrated when he or she is not allowed to perform these tasks. The process described below more effectively draws to the user's attention to a particular system modal dialog window so that the user is informed that the user must wait or complete the system prompted dialog prior to continuing any other operations.

Figure 7:
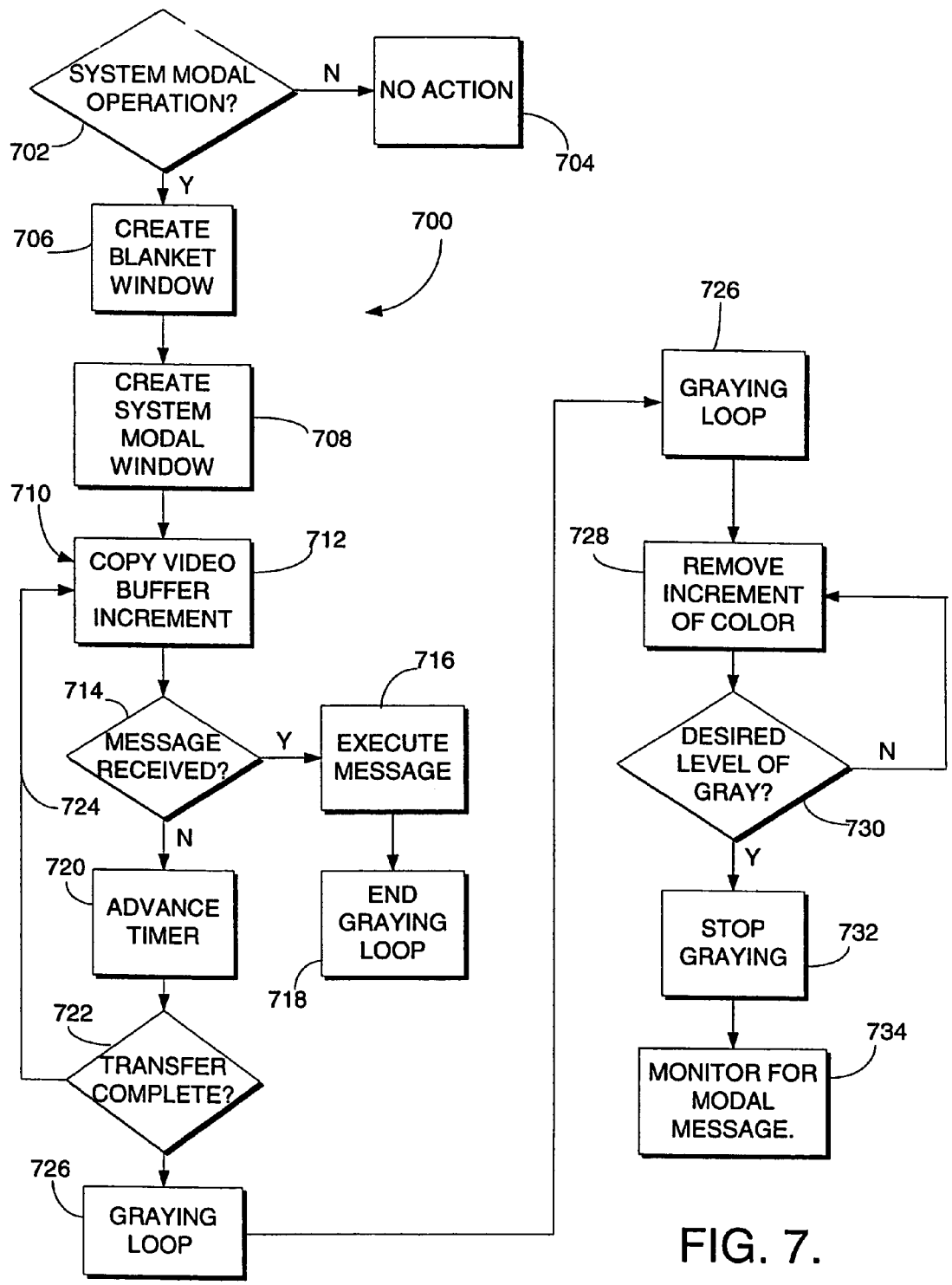
FIG. 7 is a flow diagram for one feature of the present invention.

With reference to FIG. 7, the process 700 begins by first determining if a particular operation is a system modal operation, as shown at 702. If the operation is not a system modal operation, then no further action is taken by process 700 as shown at 704. If the operation is a system modal operation, the process continues at 706 with the creation of a "blanket" window. A blanket window is a top-most window that covers the entire desktop, but that does not paint itself. In other words, the desktop appears as it did before. The effect on the user interface on the display screen is that the entire screen appears "frozen," in that actions attempted are ineffective. The process continues at 708 by rendering the system modal dialog window on top of the blanket window. The system modal dialog window is said to be a parent of the blanket window. Because the blanket window below is a top-most window, the system dialog window, as a parent window, automatically becomes a window upper to the blanket window.

The next action taken is to begin copying the video memory buffer to the system buffer in increments, as shown broadly at 710. The copying process involves a loop that begins by copying an increment of the video memory buffer to the system buffer, as shown at 712. After each increment is copied, the process determines if any message has been received from the system modal dialog window created at step 708, as shown at 714. This is said to "pump the message loop." If a message has been received from the system modal dialog window, the action required by the message is executed, as shown at 716, which ends the graying process 700, as shown at 718. For example, if a system modal dialog window is displayed that asks the user if the computer is to be shutdown, and the user indicates that the computer is to be shutdown, that command is carried out and the graying process is terminated.

If a system modal message has not been received, a timer is advanced, as shown at 720. The timer advances through the loop in defined time increments. The process next determines if the video memory buffer transfer is complete, as shown at 722. If the transfer is not complete, the process continues in the loop, back to step 712, as shown by arrow 724. If the transfer is complete, the process advances to the graying loop 726. Loop 710 incrementally copies the video memory buffer to the system buffer to carry out the graying loop 726. By incrementally copying the video memory buffer, the message loop is kept alive, so that if a system modal message is received from the dialog window, the desired action takes place without having to wait for the entire video memory buffer to be copied. In other words, the user can answer or interact with the dialog window without having to wait for any graying effect. Loop 710 thus achieves the result of copying the video memory buffer while keeping the message loop alive.

With continued reference to FIG. 7, the graying loop 726 "grays out" the color from all areas of the screen with the exception of the system modal dialog window. Loop 726 begins by first taking some amount of color from the screen pixels that have been captured, i.e. all pixels that are not part of the system modal dialog window, as shown at 728. By taking out color, the first step of graying takes place. This is achieved with a desaturation algorithm. A desaturation algorithm is chosen that removes the desired amount of color from the screen and does so on an incremental basis. By incrementally graying the screen, a gradual desaturation of color is achieved, which is less drastic to the eyes of the user. Each color in each pixel is retrieved and a weighting factor is applied to gray the pixel. For example, a suitable desaturation algorithm is:

$$\text{Gray} = (d^* \text{Get}R\text{Value}(\text{PixelColor}) + e^* \text{Get}G\text{Value}(\text{PixelClor}) + f^* \text{Get}B\text{Value}(\text{PixelColor}));$$

$$\text{PixelColor} = (\text{PixelColor} \, \& \, 0x\!f\!f000000) | RGB(\text{Gray}^*(1-c) + \text{Get}R\text{Value}(\text{PixelColor})^*c, \text{Gray}^*(1-c) + \text{Get}G\text{Value}(\text{PixelColor})^*c, \text{Gray}^*(1-c) + \text{Get}B\text{Value}(\text{PixelColor})^* c).$$

In the algorithm, c, d, e and f are constants which can be any value between 0 and 1. Constants may be changed to achieve a faster or slower graying effect. This alogorithm is simply an example of one potential implementation. Other implementations involving other color spaces, such as Hue/Saturation/Brightness or Cyan/Magenta/Yellow/Black are also within the scope of this invention. The graying loop continues at 730 by determining if the desired number of passes, resulting in the desired level of graying, have occurred. If the desired level of graying is not yet achieved, the graying loop continues by returning to step 728, where an additional amount of color is removed. In one embodiment, the desaturation algorithm is executed in 16 passes to achieve the gradual loss of color. If the desired level of graying has been achieved, the graying loop 726 stops as shown at 732. Thereafter, the screen appears gray while the user still sees the screen as it was before, but with color removed. The system modal dialog window remains in full color on the screen, thus drawing the user's attention to the window. The process continues to monitor the system modal dialog window for messages as shown at 734 and continues in this state until a message is received from the system modal dialog window or until the system modal operation is otherwise finished.

By graying out the screen with the exception of the system modal dialog window, the user's attention is directed to the window. The user is thus informed that the system modal operation must be performed before action on the computer can continue.

Fading of Text for Truncation

In graphical operating systems, text is often displayed within a rectangular window. It is also often the case that the text assigned to a particular area does not completely fit within the designated area. In this instance the prior art systems simply truncate the text so that it will fit in the space and provide an ellipses after the truncation. To achieve this, the prior art systems determine the size of the display field for the text. The prior art systems then determine the number of characters, plus the ellipses, that will fit within that amount of space. The prior art systems then display the number of characters plus the ellipses that will fit within the display field. It is the ellipses that conveys to the user that some amount of text has been truncated.

Figure 8A:
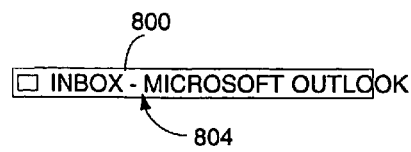
FIG. 8A is a schematic representation of a display box with text.
Figure 8B:
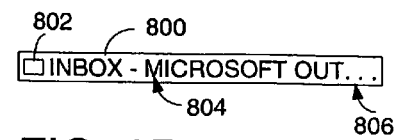
FIG. 8B is a schematic representation of the prior art truncation method.

As shown in FIG. 8A, a text display window 800 is shown. Inside the window 800 is an icon 802, which is followed by a textual description 804. In this example, the textual description has more characters than will fit within the display area 800. In the example shown, the last two letters "ok" do not fit within the display area. In the prior art, the textual description 804 is truncated by an amount which leaves room for an ellipses 806, as shown in FIG. 8B. Therefore, in the prior art systems, the text of FIG. 8A is truncated and an ellipses is added, resulting in the display of FIG. 8B.

Figure 8D:
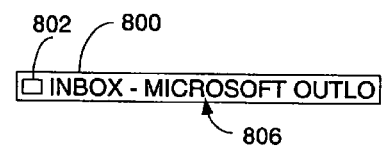
FIG. 8D is a schematic representation of the truncation feature of the present invention.
Figure 8C:
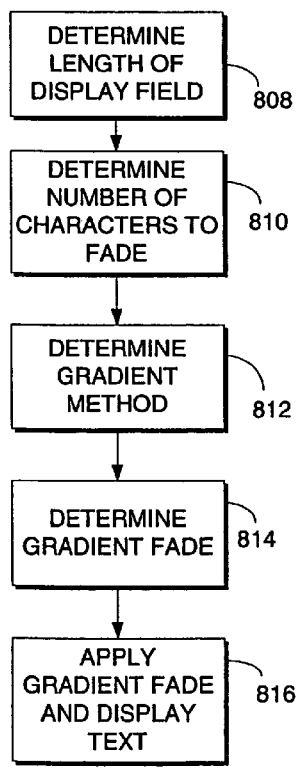
FIG. 8C is a flow diagram for the truncation feature of the present invention.

With initial reference to FIG. 8C, the method of the present invention is explained. In the method, the length of the display field 800 is first determined, as shown at 808. This is simply a determination of the number of pixels or characters that will fit within the display field. The next step in the method is to determine the number of characters to which a gradient fade should be applied, as shown at 810. This determination can result in a fixed number of characters, or can result in a percentage of the display field to fade. For example, step 810 can result in a determination that the last three characters should be faded, or can result in a determination that a gradient fade should be applied to the last ten percent of the display field. This determination is made based upon a goal of presenting a fade that is acceptable and pleasing to the largest number of people and is largely a matter of design choice.

The next step in the method is to determine the gradient fading method that is to be used to fade the area determined in step 810, as shown at 812. The gradient fading method can be applied on a per character basis or a per width basis. A fading method applied on a per character basis applies a fading weighting factor to each of the characters that have been determined to need fading in step 810. For example, if the last three characters have been determined as those desired to faded, the first character may be faded to eighty percent of full depiction, the second character at fifty percent of full depiction and the third character at thirty percent of full depiction. A fading method on a per width basis applies a weighting factor across the number of pixels in width that have been determined as needing fading in step 810. For example, if the last twenty pixels are to be faded, a fading algorithm is applied to the last twenty pixels to fade them from eighty percent of full depiction to twenty percent of full depiction. When applying this type of fading, it is desirable to fade the text within or across characters to achieve a more uniform fading appearance.

The method continues as shown at 814 by determining the gradient fade to be applied to the text. This determination is merely a determination of how fast and how much to fade the selected text. In other words, it is a determination of how much to fade the very first portion of text, how much to fade the very last portion of text, and the curvature or slope of the fading in-between these two points. The rate at which the gradient fade is applied is again largely a matter of design choice. The desired rate at which to fade is that which is most acceptable to the majority of computer users, and the exact parameters of this rate may be determined with usability studies of computer users.

After the gradient fade rate, the gradient method and the amount of text to fade have been determined, the gradient fade is applied and the text is displayed within the display window 800, as shown at 816. As an example, FIG. 8D illustrates a display window 800 of the same size as that shown in FIGS. 8A and 8B. As can be seen, the ellipses 806 present in FIG. 8B is not present in FIG. 8D. Instead, additional text is displayed in FIG. 8D. Namely, the additional letters "lo" are displayed in FIG. 8D that did not fit in FIG. 8B. The last n letters of FIG. 8D are then faded to achieve a different method of communicating truncated text to the user of the computer. For example, the last three letters "tlo" can be faded from eighty percent of full saturation to a low of twenty percent of full saturation. As the last letters fade from the user's view, the intuitive message is conveyed that additional text was truncated.

While specific numbers have been given in the above examples, it should be understood that the examples are merely illustrative of the inventive method. Other numbers could easily be used, as would be understood by one of skill in the art. By truncating the text and displaying a gradient fade out to the last n letters of text, more text can be displayed than was possible using the prior art ellipses method.

Disabled Elements in a True Color Environment

As stated above there is need to show the disabled or unavailable status of "True-color" User Interface (UI) elements. The adaptation of true color images for displaying user interface elements in applications and operating systems, necessitates a method for being able to convey a 'pleasingly disabled' look, that is consistent with what the element looks like when it is enabled. A True-color image or element is one in which nearly photographic color is presented through a process of allocating an increased amount of memory to each pixel of a display. True-color or "24-bit" color displays can show millions of unique colors simultaneously on a computer screen or other display. With such capabilities, the true color of an object can shine through to the viewer. True-color images (sometimes called 24-bit images) are composed by dedicating 24 bits of memory to each display pixel; eight pixels each for the red, green, and blue components (8+8+8=24) of a color display. In a True-color image, shape is no longer used to define the object instead, appearance is defined by the ability to use a wide variety of colors.

It was the case that when shapes were used to define an object, the unavailability or disabled state of the object was communicated by stripping the image of color thereby turning the image into a two tone image, duplicating the shape and displaying a combination of the original image and its duplicate. The duplicate image is usually displayed at a slight offset from the original thus creating an etched outline in a monochrome gray color. The old paradigm of using the shape of a UI element to make it look disabled will therefore not work on a True-color UI element since there is no shape. A system and method are provided to render True-color UI elements, so as to covey the disabled or unavailable status of the element. A goal of rendering disabled true color elements, a feature of the present invention, is thus to allow users to identify the image associated with a True-color element for what it is, and the fact that it is in a disabled state.

Figure 9:
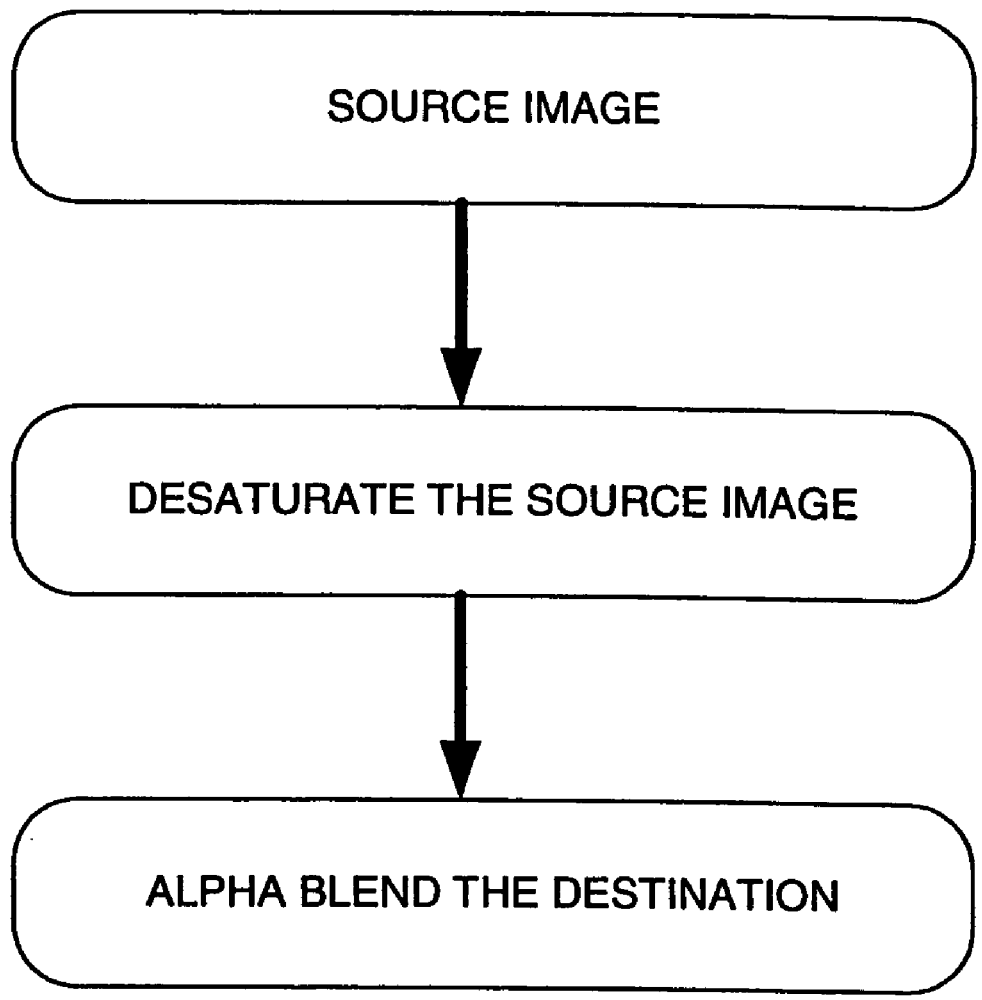
FIG. 9 is a flow diagram for one feature of the present invention.

A system and method are provide for rendering images in a color that conveys unavailability or a disabled status, and is described with reference to FIG. 9. As illustrated, the present invention is a two step process that is applied to the image of the UI element, i.e. the source image. The process begins with a step wherein the source image is stripped of color. Following this, the gray scale image that results from the previous color stripping step is alpha blended into a parent UI element. A parent UI element can be the background of an area of a screen or an object upon which the source image sits. A True-color image as previously stated, uses 24 bits to represent the color of a pixel, thus enabling the ability to generate over 16 million colors. However, there are an additional 8 bits that are also used to represent other aspects of a pixel thus bringing the total to 32 bits. The 24 color bits are broken down into color channels, red, green and blue channels, which combine to make other colors. Each of these three channels are represented by 8 bits, thus allowing 256 possible color values per channel. The additional 8 bits of pixel, also known as the Alpha channel, represent the opacity of the pixel. Opacity is used during the display of an image to merge the image with the destination or surrounding images.

The process of stripping an image of color within the present invention, involves a de-saturation of the image. In other words, the color attributes for each pixel of the image are removed, resulting in an image that is a shade of gray. In an embodiment of the present invention, the method that is used to accomplish de-saturation involves averaging the color channels and setting each channel to the value of the computed average. This process can be represented mathematically as follows:

$$A=(P_{Red}+P_{Blue}+P_{Green})/3$$

$P_{Red}=A$
$P_{Blue}=A$
$P_{Green}=A$ $P_{Color}$ represents the value for the channel associated with a particular color. A is the resultant average of the channel pixel values. The Alpha channel which is representative of opacity remains unmodified in the new gray scale image, as such, $P_{Alpha}=P_{Alpha}$.

In the next step of the process, the gray scaled image is alpha blended to the display. As previously stated, the source image contains an alpha channel, which represents opacity of the source when rendered against a destination image. A blending occurs by computing a destination channel color that utilizes the alpha channel value of the source image. As such, the color value for each channel of the destination pixel is effectively computed in the following manner:

$$D_{Red}=S_{Red}+(1-S_{Alpha})*D_{Red}$$

$$D_{Blue}=S_{Blue}+(1-S_{Alpha})*D_{Blue}$$

$$D_{Green}=S_{Green}+(1-S_{Alpha})*D_{Green}$$

$D_{Color}$ represents the value for the bits associated with the particular color in the destination pixel and $S_{Alpha}$ represents the Alpha value of the corresponding pixel from the source image. In another embodiment of the present invention, it is desired to have a constant Alpha (A) value over the top of a per-pixel alpha image. As such the blending equation is varied as follows:

$$S_{Alpha}=S_{Alpha}*A$$

$$D_{Red}=(S_{Red}*A)+(1-S_{Alpha})*D_{Red}$$

$$D_{Blue}=(S_{Blue}*A)+(1-S_{Alpha})*D_{Blue}$$

$$D_{Green}=(S_{Green}*A)+(1-S_{Alpha})*D_{Green}$$

The effect of implementing this type of blending is a merging or ghosting of the alpha channel pixel with the background. In other words, there is a more subtle transition around the edges of the source image, thereby causing a softer blending of a source image with a destination or background image. For example, a source image that is surrounded by a textured background or is placed onto a textured object, will incorporate some of the texture of its surrounding. It will be understood by those of ordinary skill in the art that the technique of combining de-saturation and blending to provide a disabled or unavailable look is not limited to icons and is applicable to other areas of a graphical operating environment. For example, a window in a graphical operating environment that does not currently have focus can be shown as unavailable, using the techniques describe herein.

Physical Presence Detector for a Computer

In more recent graphical operating systems, there are many "idle-time" or background tasks whose execution is controlled by the operating system. For example, a disk layout optimizer or a content indexer may be executed as background tasks. In the prior art operating systems, the methods used to determine when such background tasks are scheduled are relatively crude heuristics. For example, the prior art systems may monitor for keyboard or mouse input, CPU utilization or input/output rates to infer when the computer is busy or idle. This type of monitoring may be referred to as passive monitoring. As such, the background tasks will sometimes not be scheduled quickly enough, and will sometimes be scheduled too aggressively. For example, it could very well be the case that the user is sitting at the computer and is just about ready to use the computer, but the user has not used the keyboard of the mouse in some time, resulting in a background task being scheduled. It could also be the case that the user has left for an extended period of time, but the background task will not be scheduled until the time delay associated with the keyboard monitoring has elapsed. Due to the delayed start, the background task may not be completed by the time the user returns to the computer. In either instance, the scheduling may interfere with the primary or foreground task of the user.

Figure 10A:
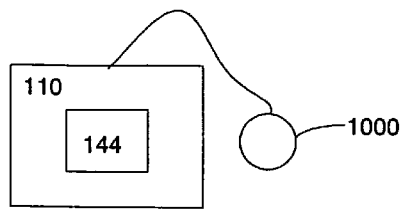
FIG. 10A is a schematic diagram of the hardware for one feature of the present invention.

With reference to FIG. 10A, the hardware associated with the present invention is shown schematically. As shown, a computer 110 is shown in block form. Computer 110 is described more completely above with reference to FIG. 1. As described above, computer 110 has an operating system 144 installed thereon. A monitoring device 1000 is coupled to computer 110 and is in communication with the operating system 144. The device 1000 is a device capable of monitoring for the physical presence of a computer user at the computer 110. For example, the device 1000 may be a proximity sensor, an infra-red detector, a photo-optical sensing device or a video camera device. Any device capable of monitoring for the physical presence of the computer user is within the scope of the present invention. Device 1000 is coupled to the computer 110 in a location allowing the device to sense the presence of the computer user. For example, the device 1000 may be coupled to the computer display monitor or the outer casing of the computer 110. Device 1000 communicates with operating system 144 such that the presence or absence of a computer user is communicated to the operating system 144.

Figure 10B:
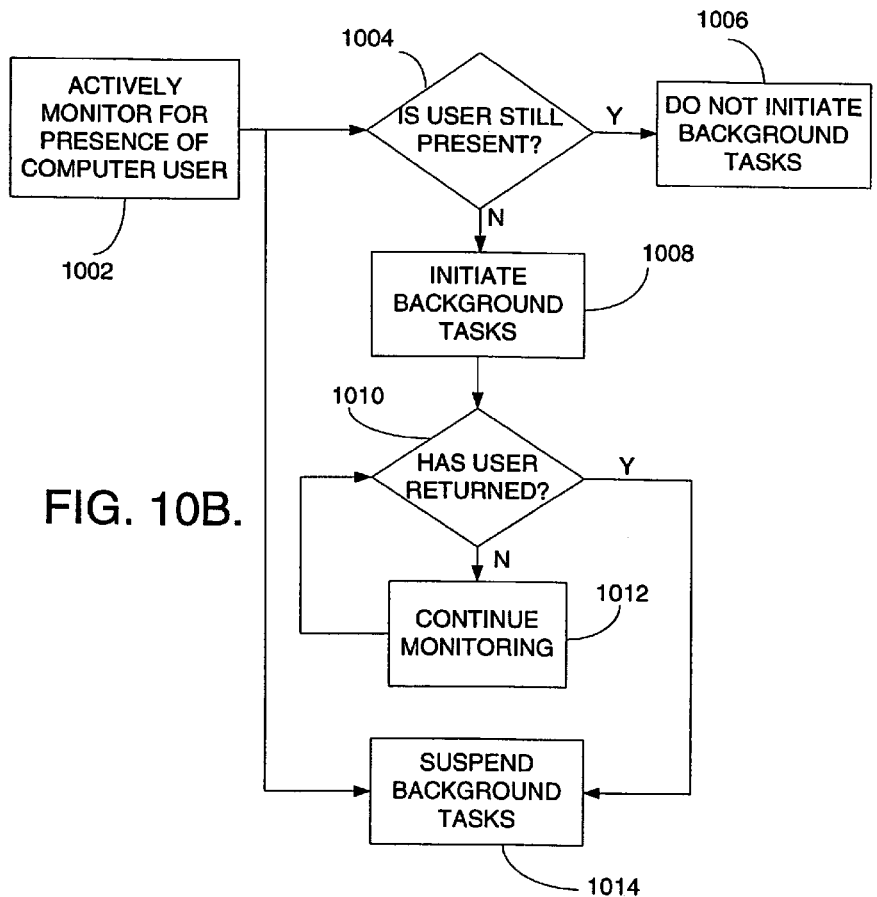
FIG. 10B is a flow diagram for one feature of the present invention.

With reference to FIG. 10B, the method of the present invention is described. The method begins by actively monitoring for the physical presence of the computer user, as shown at 1002. The active monitoring differs from the prior art passive monitoring described above in that the actual presence of the user is monitored, rather than monitoring keyboard or mouse activity and then making assumptions about the presence or absence of the computer user. The process continues by using device 1000 to determine if a user is still present at computer 110, as shown at 1004. If a user is still present at computer 110, any background tasks are not initiated, as shown at 1006. If a computer user is no longer present, the device 1000 informs the operating system 144 that background tasks may be initiated, as shown at 1008.

Once background tasks have been initiated, the device 1000 continues to monitor for the presence of the user to determine if the computer user has returned, as shown at 1010. If the computer user has not returned, the monitoring process continues, as shown at 1012. The monitoring loop continues until the user has returned. When the user returns, the device 1000 informs the operating system 144 and the background tasks are suspended as shown at 1014. The process then loops back to 1004 to determine when background tasks may again be initiated.

As an example of the invention in use, the user may initially be present at his or her computer. The user's presence is known by device 1000 and is communicated to operating system 144. If the computer user leaves the computer, the device 1000 communicates this absence to the operating system, which then initiates any background tasks. For example, if the operating system includes an indexing service that creates a content index of the documents on a the computer, the files must be scanned to determine if any changes have been made and then the index must be updated. In such a service, the scanning of files for changes can be a time-consuming process, especially the first time the service is run. The service is thus best performed as a background task so as not to interfere with the user experience in any primary or foreground application work. Using the present invention, as soon as the user leaves the computer, the scanning can be initiated more quickly than was done with prior art techniques. This allows the background tasks to be completed sooner and increases the chances that the background tasks will be completed prior to the user's return. Further, the device 1000 monitors for the return of the user, such that background tasks can be suspended upon the return of the user. This allows the operating system to cue the memory manager to start swapping foreground and background working sets even before the user touches the keyboard or mouse. The resulting benefit is that background processing time is used most efficiently with a significant increase in the responsiveness of the computer as felt by the computer user. In other words, the background tasks become truly background and any effects of the background tasks are less likely to be noticed by the computer user.

Alternative embodiments of the present invention become apparent to those skilled in the art to which it pertains upon review of the specification, including the drawing figures. The various computer systems and components shown in FIGS. 1-10 and described in the specification are merely exemplary of those suitable for use in connection with the present invention. Accordingly, the scope of the present invention is defined by the appended claims rather than the foregoing description.

We claim:

1. A user interface embodied on a computer readable medium and executable on a computer, the user interface for a file and folder system for managing image and non-image files and folders stored in a computing environment, the user interface comprising:
   a plurality of thumbnail images, each thumbnail image associated with an image file;
   an enlarged preview image corresponding to a selected one of the thumbnail images, the enlarged preview image being positioned adjacent to the thumbnail images in a preview area such that the enlarged preview image does not cover any of the thumbnail images; and
   a navigational icon presented in the user interface with the plurality of thumbnail images and the enlarged preview image, the navigational icon being-selectable by a user to enable the user to alter the enlarged preview image by iterating through the thumbnail images when the navigational icon is repeatedly selected by the user,
   wherein the location of the plurality of thumbnail images changes based on an orientation of the enlarged preview image as the user iterates through the plurality of thumbnail images, wherein the plurality of thumbnail images are located in a single row immediately below the enlarged preview image when the enlarged preview image is in a landscape orientation and the plurality of thumbnail images are located in a single column immediately besides the enlarged preview image when the enlarged preview image is in a portrait orientation.

2. A user interface as recited in claim 1, wherein the selected one of the thumbnail images is selected by at least one of a user clicking on the selected one of the thumbnail images and a user clicking on the navigational icon.

3. A user interface as recited in claim 1, the user interface further comprising a task option area for performing operations relating to the management of files and folders.

4. A user interface as recited in claim 1, further comprising a file name description presented contemporaneously with each of the thumbnail images.

5. One or more computer-readable media storing computer-useable instructions that, when used by a computing device, cause the computing device to perform a method for managing image and non-image files and folders stored in a computing environment, the method comprising:
   presenting a plurality of thumbnail images, each thumbnail image associated with an image file;
   presenting an enlarged preview image corresponding to a selected one of the thumbnail images, the enlarged preview image being positioned adjacent to the thumbnail images in a preview area such that the enlarged preview image does not cover any of the thumbnail images; and
   presenting a navigational icon in the user interface with the plurality of thumbnail images and the enlarged preview image, the navigational icon being- selectable by a user to enable the user to alter the enlarged preview image by iterating through the thumbnail images when the navigational icon is repeatedly selected by the user,
   wherein the location of the plurality of thumbnail images changes based on an orientation of the enlarged preview image as the user iterates through the plurality of thumbnail images, wherein the plurality of thumbnail images are located in a single row immediately below the enlarged preview image when the enlarged preview image is in a landscape orientation and the plurality of thumbnail images are located in a single column immediately besides the enlarged preview image when the enlarged preview image is in a portrait orientation.

6. One or more computer-readable media as recited in claim 5, wherein the selected one of the thumbnail images is selected by at least one of a user clicking on the selected one of the thumbnail images and a user clicking on the navigational icon.

7. One or more computer-readable media as recited in claim 5, wherein the method further comprises presenting a task option area for performing operations relating to the management of files and folders.

8. One or more computer-readable media as recited in claim 5, wherein the method further comprises presenting a file name description contemporaneously with each of the thumbnail images.

* * * * *